United States Patent [19]
Byerley

[11] Patent Number: 6,004,250
[45] Date of Patent: Dec. 21, 1999

[54] SYSTEM AND METHOD FOR RELEASEABLY ATTACHING OUTER SEGMENTS TO A DRUM USEFUL IN THE MANUFACTURE OF VEHICLE TIRES

[75] Inventor: Mark S. Byerley, Greenback, Tenn.

[73] Assignee: WYKO, Inc., Greenback, Tenn.

[21] Appl. No.: 08/940,206

[22] Filed: Sep. 30, 1997

[51] Int. Cl.⁶ ........................................... B25F 5/02
[52] U.S. Cl. ........................ 492/38; 29/451; 403/374.4; 156/414
[58] Field of Search ............................. 403/374.3, 374.4, 403/381, 401, 102; 29/525.01, 525.03, 451; 156/414, 417; 492/28, 38, 60

[56] References Cited

U.S. PATENT DOCUMENTS

| H906 | 4/1991 | Baggett et al. . |
|---|---|---|
| 567,918 | 9/1896 | Redeker . |
| 952,317 | 3/1910 | Eyermann . |
| 956,711 | 5/1910 | Kellog . |
| 1,662,715 | 3/1928 | Morrow . |
| 3,346,434 | 10/1967 | Fulton . |
| 3,817,812 | 6/1974 | Yabe . |
| 3,822,101 | 7/1974 | Schneider . |
| 4,292,112 | 9/1981 | Kumagai . |
| 4,436,574 | 3/1984 | Long et al. . |
| 4,616,951 | 10/1986 | Maatela . |
| 4,911,574 | 3/1990 | VanderPol et al. . |

FOREIGN PATENT DOCUMENTS

| 364055 | 11/1922 | Germany . |
|---|---|---|
| 930310 | 7/1963 | United Kingdom . |
| WO 81/02859 | 10/1981 | WIPO . |

Primary Examiner—David P. Bryant
Assistant Examiner—John Preta
Attorney, Agent, or Firm—Pitts & Brittian, P.C.

[57] ABSTRACT

System for releasably attaching a shell segment to a core section of a drum useful in the manufacture of vehicle tires. The system includes an outwardly opening longitudinal groove in the outer surface of the core section and a like groove in inner surface of the shell segment. These grooves are designed to overlie one another and cooperatively define a channel when the segment is positioned in overlying relationship to the core section. An actuator/slide/wedge/stop combination is disposed with the channel. The relationship to the actuator and the slide/wedge/stop combination is such that activation of the actuator acting upon the slide causes the slide to move longitudinally within its groove, engage the wedge and urge the wedge initially in a generally longitudinal direction along the channel until its longitudinal movement is halted by the stop, whereupon further longitudinally directed force exerted by the slide against the wedge causes the wedge to move laterally of the channel to frictionally engage the side edges of the core section groove and/or the side edges of the shell segment groove to align the shell segment with respect to the core section and to releasably anchor the shell segment to the core section. Upon deactivation of the actuator, the slide is freed to move longitudinally of the channel, thereby releasing the wedge and releasing the shell segment. In a preferred embodiment, the shell segment is divided into two pieces, e.g. halves, and there is provided a slide/wedge/stop block combination for releasably attaching each of the half-segments to a single core section. A method for releasably attaching a first member to a second member, such as shell segments to a core section of a vehicle tire-making drum, is disclosed.

14 Claims, 7 Drawing Sheets

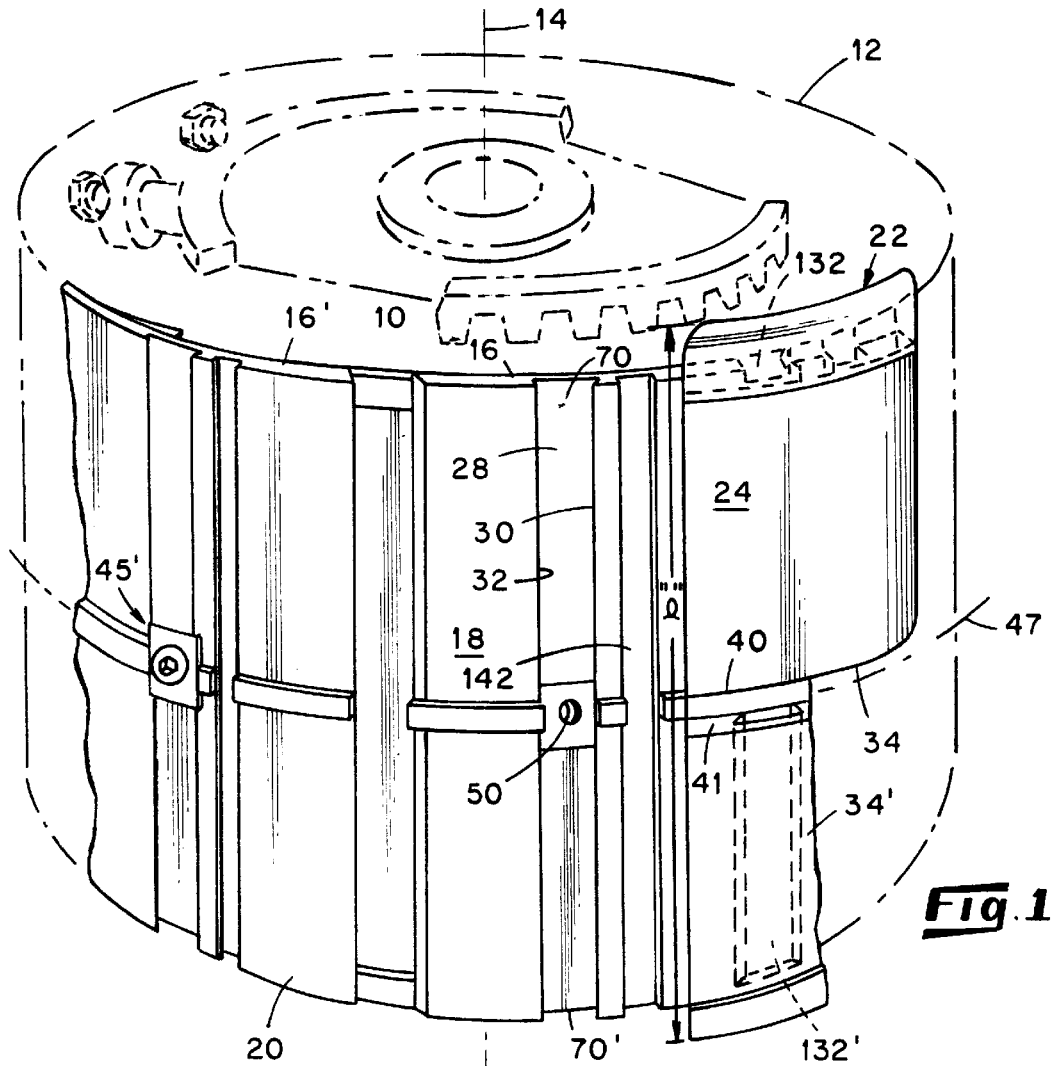
Fig. 1
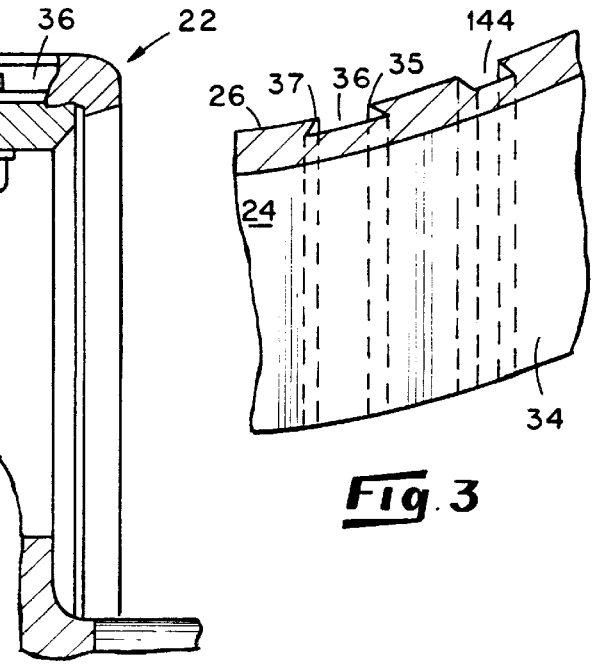
PRIOR ART
Fig. 2
Fig. 3

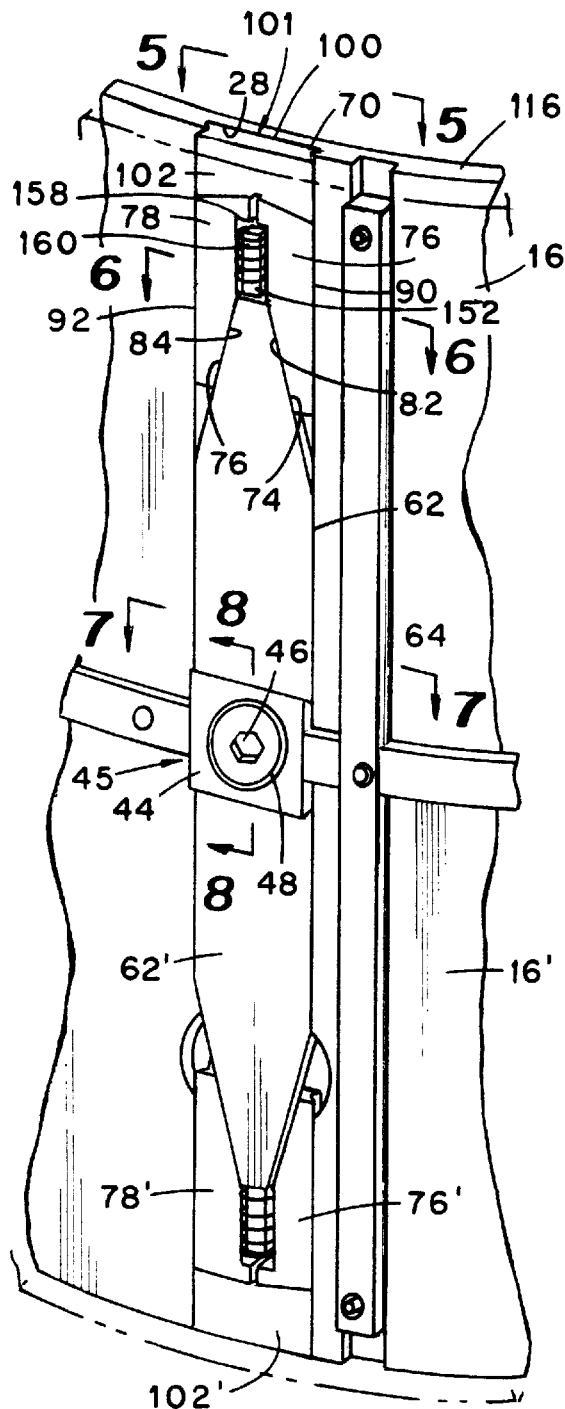
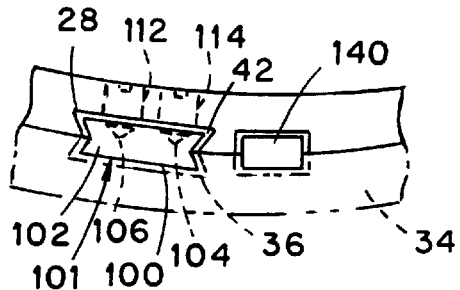
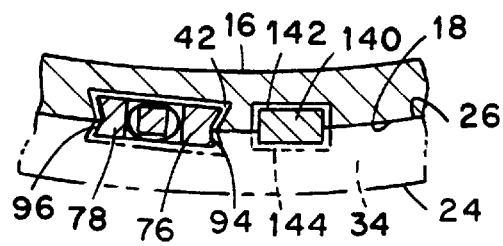
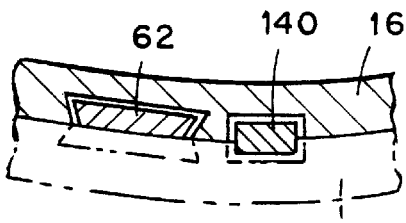
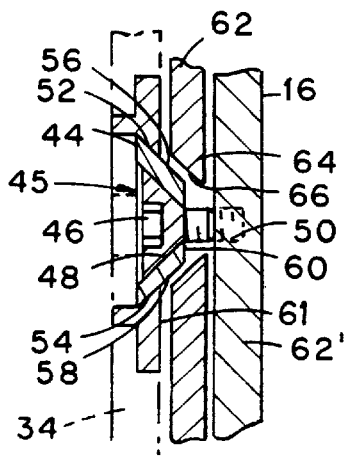

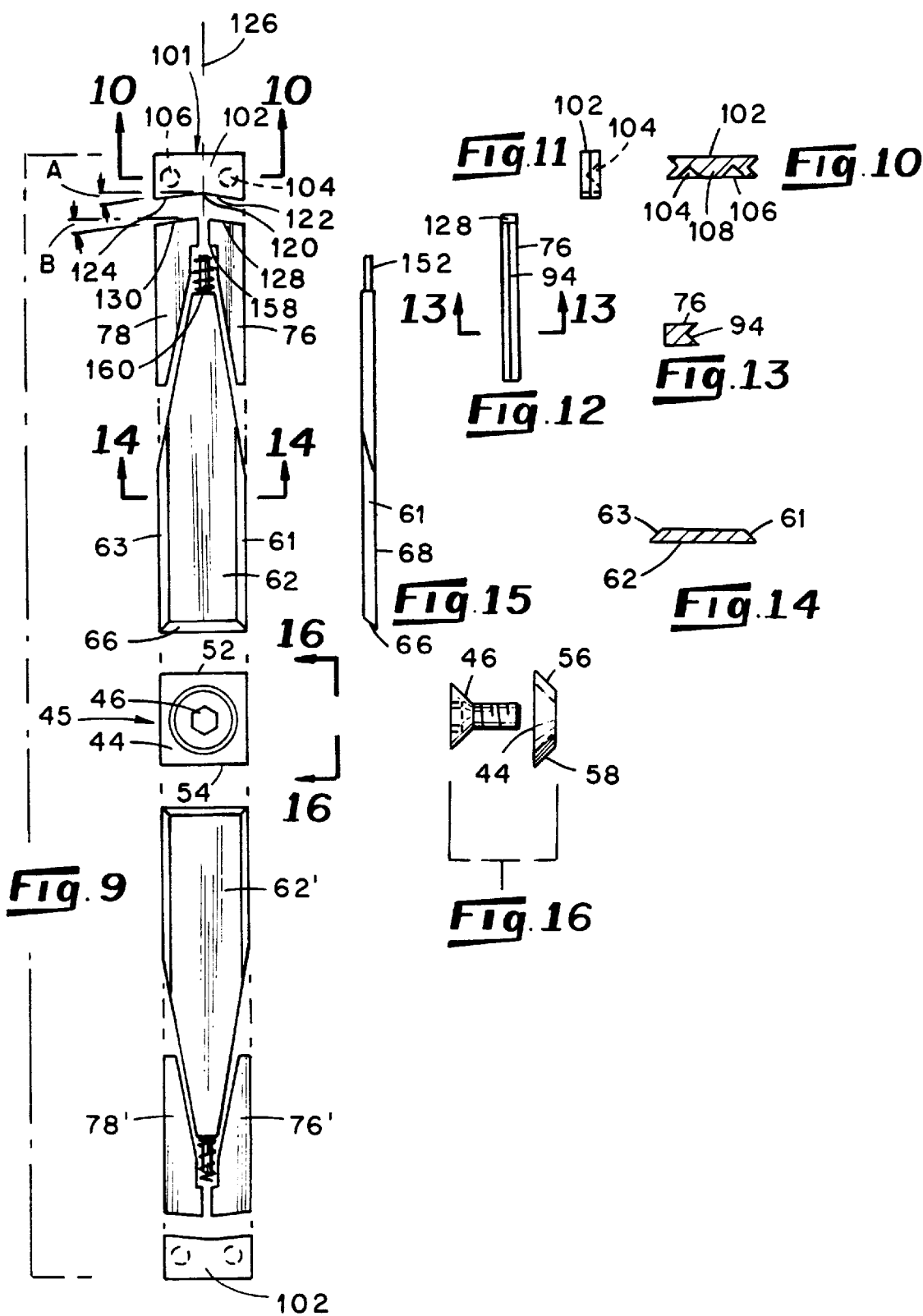

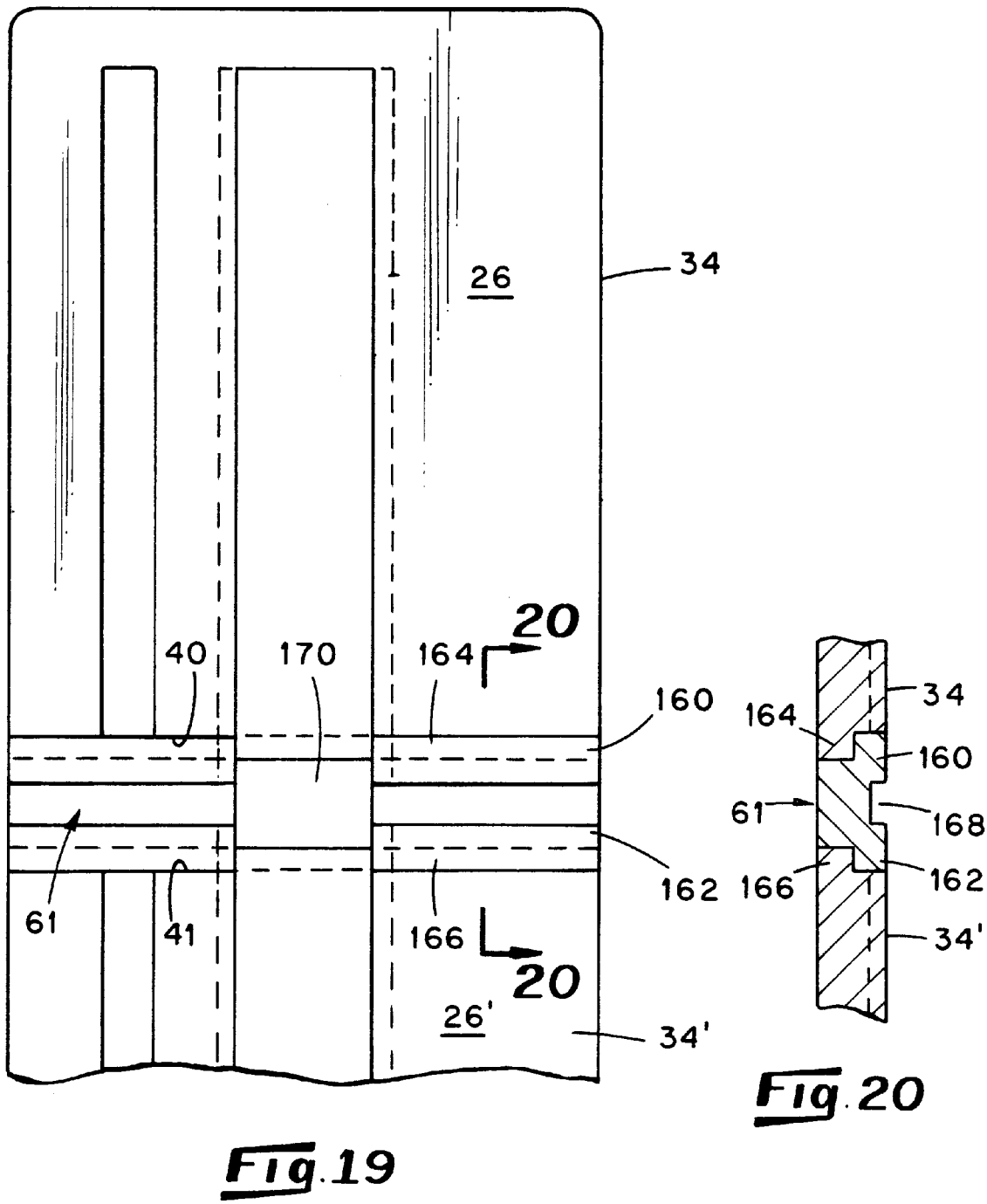

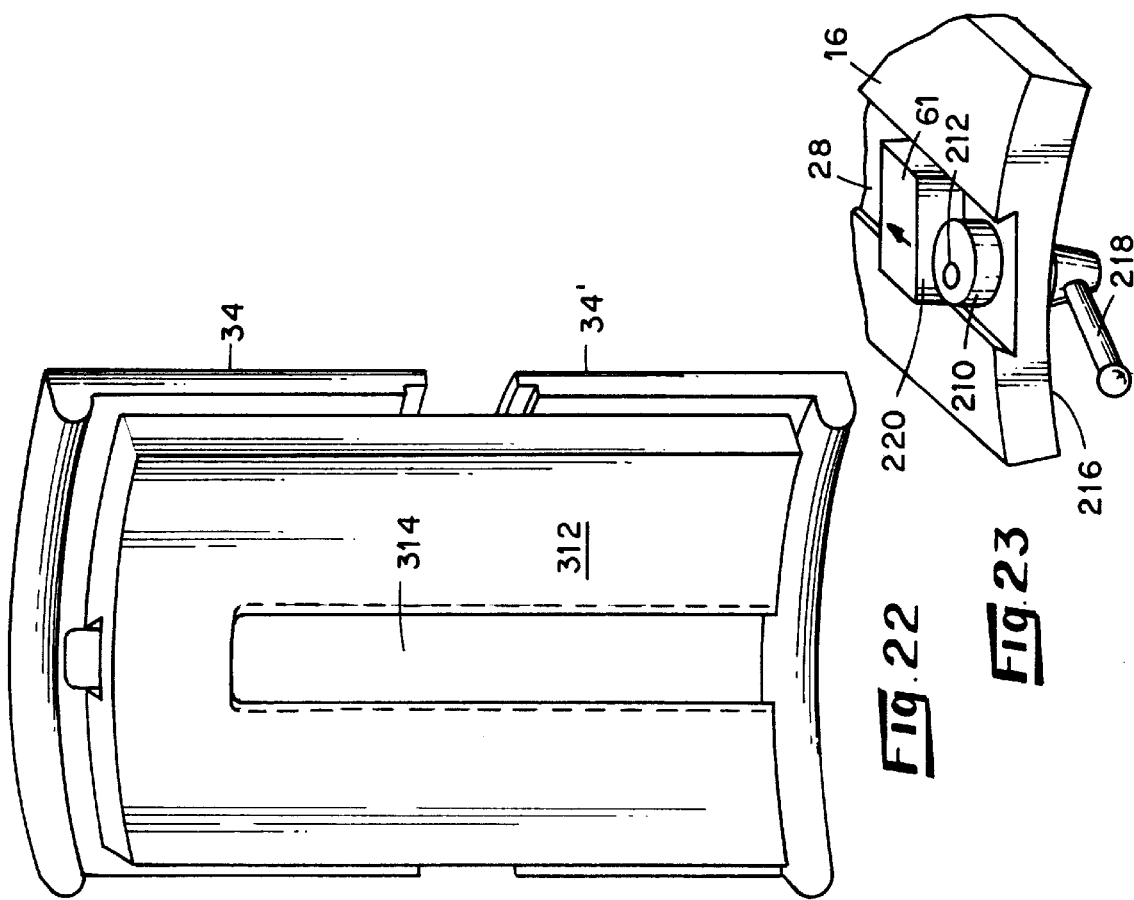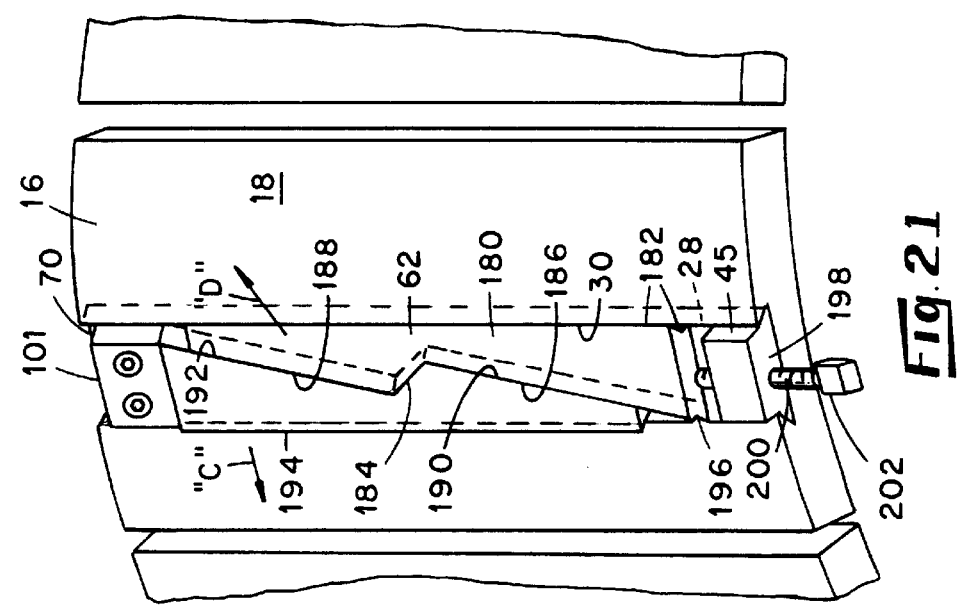

SYSTEM AND METHOD FOR RELEASEABLY ATTACHING OUTER SEGMENTS TO A DRUM USEFUL IN THE MANUFACTURE OF VEHICLE TIRES

BACKGROUND OF INVENTION

This invention relates to drums employed in the manufacture of vehicle tires and particularly to such drums having the ability to expand and retract in diameter so that the drum is useful in making different size tires and which have provision for adjusting the working length of the outer surface of the drum to make tires of different widths.

In the manufacture of vehicle tires, it is common practice to fabricate separate elements of the tire and thereafter to marry the elements. Certain of these elements are generally thyroidal in geometry and are fabricated on a rotating drum by laying down fabrication materials on the outher circumferential surface of the drum as the drum is rotated. This procedure builds up the element on the drum. The diameter of the drum at its outer circumference is employed to establish the inner diameter of the element which is fabricated on the drum. After fabrication of the element, the drum commonly is collapsed, that is, its diameter is reduced so that the completed element can be Withdrawn from the outer surface of the drum. Collapsible drums are well known in the tire-making industry.

Whereas the outer circumference (diameter) of a drum is employed to establish the inner diameter of a tire element made on the drum, the length of the drum (its outer surface dimension measured in a direction parallel to its axis of rotation) is employed in establishing the width of a tire. In either instance, it is desirable that a given drum be adjustable in circumference and in length. Adjustment of the drum circumference is provided for by several means in the prior art and most always involves the use of a plurality of segments which define the outer surface of the drum, the segments being required to permit the movements necessary to radially inwardly collapse the circumference of the drum. On the other hand, adjustment of the length of a drum is currently limited to replacement of the individual segments which collectively define the outer surface of the drum, frequently employing "left" and "right" hand segment halves which are individually removably secured to a core section of the drum. Spacers interposed between the inboard adjacent ends of the two segment halves permit the use of fixed-length segment halves to attain drum lengths in excess of the combined lengths of the segment halves themselves. Because the outer surface of the drum must remain smooth and as continuous as possible, the means for securing the segments to the core section heretofore has been disposed generally on the inside the core. To change the length of such a drum requires that an operator be able to reach inside the core to loosen and/or tighten bolts, screws, or other fastening means, and at the same time hold the segment half in proper alignment with its core section and adjacent segments, as well as the relationship of the segment half with its mating segment half. Obviously excessive time and energy, not to mention frustration, are involved in these prior art drums. Further, in certain prior art segment attachment devices, the mere act of attaching the segment to a core section tends to move the segment relative to the core.

One prior art drum which suffers from certain of the aforedescribed problems is described in U.S. Pat. No. 4,636,277, which patent is incorporated hereir in its entirety by reference. In the drum described in this patent, each half segment is releasably secured to a respective core section of the drum by means of two locking lugs secured on the outboard ends of respective bolts that are loosely mounted in the core section wall and project radially outwardly of the core section such that the lugs are received in a mating slot provided in the inner surface of the segment half. Upon application and tightening of a nut on each bolt, the lugs, hence the segment half, are drawn radially inwardly of the core section to cause the segment half to encage and be securely attached to the core section. To access these nuts and bolts interiorly of the core requires the workman to reach inside the core and manipulate a wrench for loosening or tightening the nuts, while simultaneously holding the segment half in position for receipt of the locking lugs and for subsequent adjustment of the position of the segment half relative to its core section. In a drum having eight segments, each of which comprises two halves, in this particular drum, there are thirty-two nuts which have to be individually manipulated to remove or secure all the segment halves to the core of the drum, resulting in excessive time and expense to perform a length change on the drum.

It is therefore an object of the present invention to provide a system for efficiently and effectively releasably securing a drum segment to a drum core.

It is another object of the present invention to provide a method for releasably securing a drum segment to a drum core and which is both efficient and effective.

Other advantages and objects of the present invention will be recognized from the description contained herein including the claims and drawings in which:

FIG. 1 is a representation of a portion, partly in phantom, of a prior art drum useful in the manufacture of a vehicle tire and which includes outer half-segments secured to a core section, a portion of the core section of the drum being depicted in separated relationship, and depicting a portion of the elements of the present invention as employed in the securement of segments to the core of the depicted drum;

FIG. 2 is a representation, in section, of a portion of the drum depicted in FIG. 1 and showing a prior art nut and bolt means for attaching a segment to the drum core.

FIG. 3 is a representation of a portion of a half-segment employed in the present invention;

FIG. 4 is representation of a portion of a drum core section and depicting one embodiment of apparatus of the present invention as employed to secure two half-segments to the drum core section.

FIG. 5 is a top view of a portion of the drum core section depicted in FIG. 4 taken generally along line 5—5 of FIG. 4;

FIG. 6 is a sectional view taken generally along the line 6—6 of FIG. 4;

FIG. 7 is a sectional view taken generally along the line 7—7 of FIG. 4;

FIG. 8 is a sectional view taken generally along the line 8—8 of FIG. 4;

FIG. 9 is an exploded plan view of one embodiment of apparatus employed in the present invention;

FIG. 10 is a sectional view of a stop block of the present invention and taken generally along line 10—10 of FIG. 9;

FIG. 11 is a side view of the stop block depicted in FIG. 9;

FIG. 12 is a side view of a wedge element of the present invention as viewed from the right hand side of FIG. 9;

FIG. 13 is a sectional view of the wedge segment depicted in FIG. 12 and taken generally along line 13—13 of FIG. 12;

FIG. 14 is a sectional view of a slide element of the present invention and taken generally along line 14—14 of FIG. 9;

FIG. 15 is a side view of a slide element of the present invention as viewed from the right hand side of FIG. 9;

FIG. 16 is an exploded side view of a camming block and set screw combination as employed in one embodiment of the present invention and taken generally along line 16—16 of FIG. 9;

FIG. 19 is a plan view of the inner surfaces of two half-segments (one only partially depicted) and depicting a spacer interposed between their adjacent inboard ends;

FIG. 20 is a sectional view taken generally along line 20—20 of FIG. 19;

FIG. 21 is a representation of a portion of the core sections of a drum and depicting an alternative embodiment of the apparatus of the present invention as associated with a core section;

FIG. 22 is a representation of a diameter spacer having two half-segments attached to the outer surface thereof, and depicting the inner surface thereof as suitable for attachment thereof to a core section such as depicted in FIG. 21;

FIG. 23 is a partial view representation of an alternative embodiment of a side actuator suitable for use in the apparatus of the present invention;

SUMMARY OF INVENTION

Figure 18:
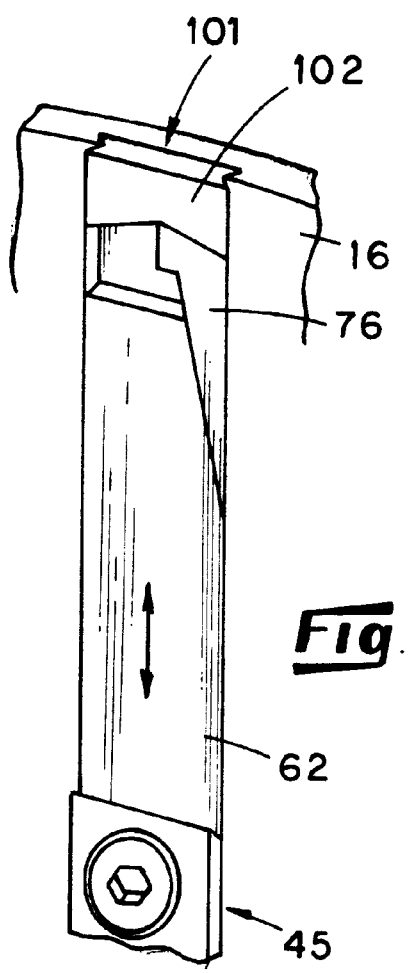
FIG. 18 is a representation of an alternative embodiment of a side/wedge/stop combination of the present invention.
Figure 17:
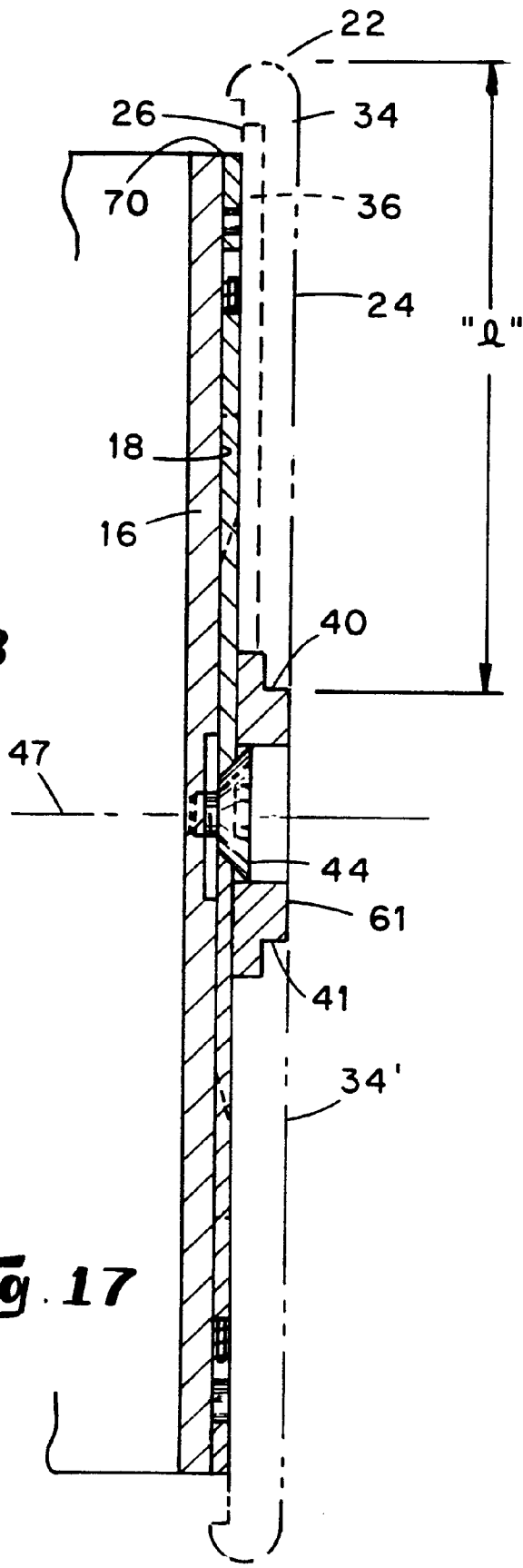
FIG. 17 is a side elevational view, in section, of one embodiment of a core section having two half-segments attached thereto, the half-segments being depicted in phantom.

In one embodiment of the system of the present invention, each of the segments which cooperates with other segments to define the outer circumference of the drum is divided into substantially mirror halves, the division being made along a line midway between the opposite ends of the segment and normal to the length dimension of the segment, e.g., along the equator of the drum. Each half-segment is substantially independently secured to a core section, with the inboard ends of the half-segments either abutting or adjacent one another. By this means, the effective length of the combined half-segments can be increased or decreased by spacing the inward ends of the half-segments more or less in spaced apart relationship. In practice, the space between the spaced apart ends of the half-segments is filled with a spacer to provide a continuous outer surface of the drum. Whereas half-segments are common, the present invention also contemplates the securing of full segments to a core.

Attachment of the half-segments to the core section is by means of a system of multiple components which coopera-tively function to readily permit selection of the position of each half-segment, relative to its core section, in a direction parallel to the length dimension of the half-segment and thereupon anchoring the half-segment, in its selected position, to a core section. In one embodiment of the present system, each core section is provided on its outer surface, and each half-segment is provided on its inner surface with an outwardly opening dovetail groove. The core section groove is aligned substantially parallel with the rotational axis of the drum. The segment groove is provided in that: surface of the half-segment which is intended to overlie and mate with the outer surface of the core section and extends substantially parallel to the length dimension of the half-segment. Thus when the half-segment is overlaid on the outer surface of the core section, the grooves face one another, are aligned with one another, and mutually define an open channel which is generally rectangular in cross section, but which includes inwardly directed V-shaped projections defined in each of its opposite side edges, one leg of each V-groove being defined by an inwardly directed side edge of a respective dovetail groove. In accordance with one aspect of the present invention, there is provided within this open channel a plurality of operatively associated elements which function to align and anchor each half-segment with respect to the core, including alignment of the length dimension of each halfsegment with the rotational axis of the drum, alignment of mating half-segments with respect to one another, and with the adjacent ends of the cooperating half-segments in a desired spaced apart relationship to one another. The system provides for rapid securement of the half-segments to a core section and like rapid removal of the half-segments from the core section or change of the spatial separation of the adjacent inboard ends of the cooperating half-segments to increase or decrease the effective length dimension of the drum.

In accordance with one aspect of the present invention, the multiple components of the present system include an actuator and a slide/wedge/stop combination set associated with the channel defined by the overlaying dovetail grooves in the core section and segment halves. In the most common embodiment, there are two combination sets per core section, these sets being mirror images of one another, one set being disposed on one side of that midline of the core section which is normal to its length, and the other set being disposed on the opposite side of this midline. In each combination set, an elongated slide member is slidably disposed within the channel, and more specifically within one of the dovetail grooves in the core section or half-segment. In one embodiment, this slide member includes a camming surface on its end that is disposed adjacent the actuator and the actuator acts upon this end surface such that activation of the actuator effects longitudinal movement of the slide along the length of the channel. In one embodiment, the opposite end of the slide is tapered inwardly with smooth side edges. Along each of the opposite tapered side edges of the slide there is provided a wedge member which is slidably disposed within the channel, both in longitudinal and transverse directions with respect to the channel and the grooves which define the channel. Each wedge member includes a smooth inwardly directed side edge that matingly and operatively engages a respective smooth side edge of the slide. The opposite side edge of each wedge is provided with a V-groove. One half of this V-groove is received within the dovetail groove in the core section. The other half of this V-groove is received within the dovetail groove provided in the facing surface of a half-segment. By this means, the half-segment and the core section are interconnected, loosely initially, but eventually rigidly. Distally of the distal ends of the wedge members, there is provided a stop which is secured in the distal end of the channel to limit the movement of the wedge members in a direction distally of the channel. Thus, upon activation of the actuator, it acts against the camming surface on the inboard end of the slide to urge the slide toward the distal end of the channel. This action causes the tapered smooth side edges of the opposite end of the slide to urge the wedge members in a direction distally of the groove until the distal ends of the wedges engage the stop. Thereupon, further urging of the slide distally of the channel causes the wedge members to move laterally of the channel and frictionally engage the side edges of the channel. Since the wedge members are in engagement with the dovetail grooves in the core section and half-segment, this lateral movement of the wedges further serves to cause the wedges to frictionally engage the side edges of the dovetail grooves. This wedging action first serves to align the half-segment dovetail groove, hence the half-segment itself, with the groove in the core section, thereby aligning the half-segment with the rotational axis of the drum. The wedging action further serves to anchor the half-segment to the core section. The mirror image combination set of slide/wedge/stop serves in like manner to attach the mirror image half-segment to the same core section, but on the opposite side of the midline of the core section.

In a preferred embodiment, the actuator is accessible exteriorly of the drum. Further, preferably, the engagement of the actuator with the slide is in the form of a cam/cam follower arrangement. Activation of the actuator thus comprises a single action by an operator to effect the anchoring of the two half-segments to the core section once the half-segments are fitted onto the respective wedge members and in the desired longitudinal position relative to the core section. Choice of the position of each half-segment relative to the length of the core section is merely a function of sliding the half-segment over its wedge members by a desired distance. Once so positioned, anchoring of the half-segments is a "one-hand" operation effected from externally of the drum. Release of the half-segments is effected by releasing or deactivating the actuator. In one embodiment, withdrawal of a slide from its extended position in wedging engagement with its associated wedge members is enhanced by spring means disposed between the distal end of the slide and either the stop or lugs on the distal ends of the wedge members.

It will be recognized that the minimum length of the drum is dependent upon the combined lengths of the two half-segments when their inboard ends abut. For other drum lengths, the segment halves are disposed apart and a spacer is positioned between their inboard ends to fill the gap therebetween.

DETAILED DESCRIPTION OF INVENTION

With reference to the several Figures, which like elements are identified with prime numerals, a system of the present invention is incorporated in the core 10 of a rotatable drum 12 having an axis of rotation 14. The core 10 includes a plurality of sections 16,16', for example, which are radially moveable between withdrawn and extended positions radially of the rotational axis of the drum for purposes of selecting the diameter of the drum. Each section 16 includes an outer convex surface 18. When in their extended positions, these core sections cooperatively define the outer surface 20 of the core. In their withdrawn positions (radially inwardly of the drum), the core sections effectively collapse the drum to a lesser diameter to permit removal of a tire component from the drum, among other functions. In the art there are various well-known mechanisms available for effecting the radial positioning of the core sections.

Commonly, each core section has affixed thereto a shell segment 22 (see FIGS. 1—3) that includes an arcuate (convex) outer surface 24 and an inner concave surface 26 which is adapted to overlie the outer surface 18 of a core section 16 and to be moved radially inwardly and outwardly of the drum by the movement of the core sections. In the present disclosure, the shell is depicted and described as being in two parts, each part being termed a "half-segment". Further, the invention is described herein primarily in terms of a single combination set of slide/wedges/stop for clarity, but it is to be recognized that two such combination sets are employed when employing two half-segments. If desired, the present invention may be employed to attach a single segment (e.g., a full-length segment) to a core section, but at the expense of losing adjustability of the length of the drum other than by replacing the full segment with a shorter or longer full segment. Further, it is not required that the half-segments be of equal length, but such equality in length is preferred.

In the depicted embodiment of the present system, each core section includes a dovetail groove 28 opening outwardly of the outer surface of the core section and including side edges 30 and 32 which project inwardly of the groove. This groove 28 preferably extends along the full length of the core section and opens outwardly of each end of the groove. In the depicted embodiment, each core section 16 is provided with two half-segments 34 and 34'. Each half-segment, 34, for example, is provided with a dovetail groove 36 (see FIG. 3) which opens outwardly of the inner surface 26 of the half-segment and extends from the inboard end 40 of the half-segment substantially along the length dimension, "1", of the half-segment. Preferably, this groove terminates short of the out-board end 41 of a half-segment. This groove 36 preferably is essentially identical in cross-sectional geometry and dimension as the groove 28 in the core section outer surface and includes inwardly directed side edges 35 and 37. The groove 28 in the core section outer surface is preferably aligned parallel to the rotational axis of the drum, and the groove 36 in the half-segment is aligned parallel to the length dimension, of the half-segment. The concavity of the inner surface 26 of the half-segment provides for mating fit of the half-segment in covering relationship to the convex outer surface 18 of its respective core section. By this means, the dovetail grooves are positionable in facing relationship to one another and in alignment with one another to cooperatively define a channel 42 that extends parallel to the rotational axis 14 of the drum. Each half-segment 34,34' includes an inboard end 40 and 41, respectively, so that when two half-segments are mounted on a given core section, the inboard ends 40 and 41 of these half-segments are disposed adjacent one another preferably at or near the equator 47 of the drum.

Within the groove 28, the present system includes an actuator 45 which in the embodiment depicted in FIG. 1, 4, 8 and 9 particularly, is in the form of rectangular block 44 which is mounted within the groove 28 in the core section surface as by means of a recessed set screw 46 or like fastener means, that extends through a through opening 48 in the block 44 and threadably engages an internally threaded opening 50 in the core section 16. It will be recognized that tightening of the set screw 46 will cause the block to move radially inwardly toward the core section. The opposite side edges 52 and 54 of the block define camming surfaces 56 and 58, respectively. Each of these camming surfaces is inclined inwardly of the bottom surface 60 of the block. As desired, the thickness of the block may cause it to project out of the core section groove and into an appropriate open space in a spacer 61 disposed between the inboard ends 40, 41 of the half-segments 34,34'.

Further, in the present system, there is provided a slide 62 which, in a preferred embodiment, is slidably disposed within the groove 28 in the core section. In the depicted embodiment, the side edges 61 and 63 of the slide 16 are each chamfered to permit these side edges to be slidably received within the groove 28. The inboard end 64 of the slide defines a camming surface 66 which, in the embodiment depicted in FIG. 4, is inclined outwardly of the bottom surface 68 of the slide and is disposed in mating underlying relationship to a camming surface 56 of the block whereupon tightening of the set screw 46 causes the block to move radially inwardly toward the core section and causes the camming surface 56 of the block to engage the camming surface 66 of the slide and urge the slide to move in a direction away from the block and toward the distal end 70 of the groove 28, ie., toward its extended portion. Upon withdrawal of the set screw from the core section, the block is released such that the slide is free to move in a direction toward the block and away from the distal end of the groove 28, ie., toward its retracted position. In one embodiment, the thickness of the slide 62 is not materially greater than the depth of the groove 28 so that the slide does not project from the groove to interfere with the mounting and adjustment of a half-segment onto a core section.

In the embodiment depicted in FIGS. 4–7, the opposite side edges 74 and 75 of the distal end 72 of the slide which is opposite the inboard end 64 thereof, are tapered inwardly of the slide to provide opposite smooth side edges thereof. Within the channel 42 and along each of the side edges of the slide, there is provided a wedge member 76 and 78, respectively. Each wedge member 76 and 78 is of a cross-section and is dimensioned such that, in combination with the cross-sectional geometry of the slide disposed between the wedge member, it defines an overall cross-section which is substantially the same as the cross-sectional geometry and dimensions of the channel 42, but sufficiently smaller as permits sliding movement of the wedge both longitudinally and laterally of the channel 42. Each wedge includes a tapered inside edge 82 and 84, respectively, which engages a respective one of the side edges 74 and 75 of the slide to cooperatively define camming surfaces between the wedges and the slide. Each of the outer side edges 90 and 92 of the wedges 76 and 78 is provided with a V-groove 94 and 96, respectively (see FIG. 6). The V-groove 94 in the side edge 90 of the wedge 76 is adapted to receive therein the inwardly projecting and overlying side edges 30 and 35 of the dovetail grooves 28 and 36, respectively, while the side V-groove 96 of the wedge 78 is adapted to receive therein the inwardly projecting and overlying side edge 32 of the dovetail groove 28 and the side edge 37 of the dovetail groove 36 thereby effectively joining these dovetail grooves in overlying and aligned relationship in a relatively loose manner which permits the sliding of the half-segment 34 relative to its core section in the direction of the length dimension of the groove 36 in the half-segment. In an alternative embodiment, as depicted in FIG. 18, only one side edge Df the slide 16 is tapered and only one wedge 76 is employed.

After the slide and its accompanying wedges are disposed within the groove 28, hence within the channel 42, the distal end 100 of the channel is closed by a stop 101. The depicted stop is in the form of a block 102 of a cross-section and dimensions that are substantially the same as the cross-sectional geometry and dimensions of the channel 42, but slightly smaller in dimension so as to be snugly received in the open distal end 100 of the channel. The depicted stop is provided with two conical depressions 104,106 in that surface 108 thereof which faces the groove 28, for the receipt therein of the conical tips of two set screws 112 and 114 that are received in internally threaded openings through the wall 116 of the core section 16. The combination of conical depressions and conically-tipped set screws provides for a degree of adjustability of the longitudinal position of the stop within the groove 28, thereby permitting the stop to be adjusted to accommodate any needed slight adjustment in the maximum limit of longitudinal movement of the wedges before the wedges commence lateral movement.

As depicted in FIG. 4, and particularly FIG. 9, that surface 110 of the stop which is disposed longitudinally inward of the distal end 70 of the groove 28 is divided into two sections 122 and 124 which are of equal length. Each section is tapered inwardly toward the centerline 126 of the surface 110 by at least about 5 degrees as indicated by the arrow "A" in FIG. 9. Further, the distal ends 128 and 130 of the wedges 76 and 78, respectively, are also tapered to provide a matching angle, "B", e.g., 5 degrees, so that these ends of the wedges slidably engage respective ones of the tapered surfaces of the stop to enhance the lateral movement of the wedges, especially when the wedges are free to move laterally inwardly of the groove 28 and out of engagement with the sides of the channel 42.

As depicted, the present system provides for a second, and mirror image, set of the slide/wedges/stop components associated with the opposite distal ends 70,70' and 132,132' of the grooves 28 and 36, respectively (see FIG. 1). Referring specifically to FIGS. 4 and 8, the slide 62' of the second set of components includes a camminag surface 66' on its inboard end 64' which mates with the camming surface 58 on the side edge 54 of the actuator 45. Thus, activation of the actuator 45 serves to simultaneously move the slides 62 and 62' along the length dimension of the groove 28, but in opposite directions, toward their respective extended positions, or conversely, to release the slides for their withdrawal toward their respective retracted positions and away from camming engagement with their respective wedges.

Once the half-segments have been positioned with their respective dovetail grooves engaging the wedges associated therewith, an operator may slidably move a half-segment relative to its set of wedges to select the position of the half-segment relative to its respective core section for the purpose of selecting the length dimension of the drum. Once the two half-segments associated with a respective core section are so positioned, the space therebetween is filled with a spacer 61, and the half-segments may be anchored simultaneously to their core section by the simple action of tightening the set screw 46 to thereby move the block 44 radially inwardly of the core, thereby urging the slides 62 and 62' into camming engagement with their respective wedges 76 and 78, and 76' and 78'. Because the wedges are limited in the extent of their movement toward the distal ends 70 and 132 of the groove by a stop, once the distal ends of the wedges contact a stop, the wedges are urged laterally outwardly relative to the grooves 28 and 36, i.e., the channel 42, to frictionally engage and lock the wedges within the dovetail grooves 28 and 36. This action serves to align the length dimension of each of the half-segments with the length dimension of the core section, hence in parallel alignment with the rotational axis of the drum. The action further serves to rigidly anchor the half-segments to the core section. At no time is it required that the operator reach inside the drum to position or reposition the half-segments for changing the length dimension of the drum. The operator is thus protected against injury due to their hands or arms striking an internal component or surface of the drum. Further, because all alignment of the half-segments is effected externally of the drum, the ease, speed and precision of selecting or adjusting the length dimension of the drum is enhanced. Importantly, in the present invention, the forces exerted upon the half-segment in the course of anchoring it to the core section are directed substantially non-parallel, i.e., substantially laterally of the length dimension of the grooves 28 and 36. In an alternative embodiment, the anchoring forces are directed substantially radially of the drums, FIGS. 25 and 26. By these means, in the course of anchoring a half-segment to its core section, there are no material forces exerted upon the half-segment that tend to urge the half-segment in a direction longitudinally of the grooves 28 and 36, such as would tend to alter the longitudinal position of the half-segment relative to these grooves. This aspect of the present invention contributes to the ease of alignment and anchoring of the half-segments to their core sections.

In one embodiment of the present apparatus, the distal end 150 of each slide 16, for example, is provided with a stub lug 152 which projects from the end of the slide toward, and terminates short of, first and second leg portions 154 and 156 of those wedges 76 and 78 which are associated with the slide 16. These leg portions of the wedges face inwardly toward one another to cooperatively define a shoulder 158 therebetween. Spring means 160 is provided in encircling relationship to the lug 152 and between the slide and the shoulder defined by the leg portions 154 and 156 of the wedges. By this means, the slide is resiliently biased in a direction away from the distal end 70 of the groove 28 and toward the actuator 45. This bias enhances the movement of the slide toward its retracted position away from the wedges and thereby aids in the release of the wedges from their frictional and anchoring position with respect to the core section 16 and the overlying half-segment 34.

As an aid to the initial positioning of a half-segment in overlying relationship to its respective core section, the present inventor further provides an optional elongated metal key 140 fixedly secured in an outwardly opening keyway 142 in the outer surface 18 of each core segment 16. The depth of the keyway 142 is chosen to be less than the thickness of the key 140 so that at least a portion of the key projects outwardly from the surface 18 of the core section. In the inner surface 26 of each half-segment 34 there is provided a further outwardly opening keyway 144 which is adapted to removably receive therein that portion of the key which projects from the surface of the core section. The locations of the keyways in the core section and the half-segment are chosen such that when the half-segment is in proper alignment with its respective underlying core section, the key is received within the keyway 144 of the half-segment. The fit between the key 140 and the keyway 144 in the half-segment is chosen to provide for sliding movement of the half-segment with respect to the key which is fixed to the core section, thereby permitting adjustment of the position of the half-segment in the longitudinal direction of the core section when selecting the length of the drum.

In FIGS. 19 and 20, there is depicted a typical half-segment 34 and a portion of a further, and mirror image, half-segment 34'. The view of FIG. 9 depicts the inner concave surfaces 26 and 26' of the half-segments and dovetail grooves 36 and 36' opening outwardly of the respective half-segments 34,34'. Further, in FIGS. 19 and 20 the inboard ends 40,41 of the half-segments are shown adjacent, but separated from, one another to provide an increased length dimension for a drum. The space between the adjacent ends of the half-segments is essentially filled by a spacer 61. The depicted spacer 61 includes shoulders 160 and 162 on opposite sides thereof which interlock with shoulders 164,164 on the inboard ends 40,41 of the half-segments and the core section. In one embodiment, the core section is provided with a shoulder 166 (see FIGS. 1 and 4) which extends transversely of the length dimension of the core section, preferably midway between the opposite ends of the core section, that serves as a positioning guide for the placement of the spacer 61. To this end, the spacer is provided with a groove 168 along its length for receiving therein the guide shoulder 166. Further, the spacer is provided with a cavity 170 therein for receipt of the block 44 of an actuator 45 as required.

FIGS. 21, 23, 24 and 25 depict further embodiments of the apparatus of the present invention. Specifically, in FIG. 21 the slide 62 comprises an elongated member 180 having a first side edge 182 which is chamfered along its length such that this first side edge is received within one side 30 of the dovetail groove 28 in the outer surface of the core section. The opposite side edge 184 of the slide is contoured with two smooth camming surfaces 186 and 188 that are disposed in tandem along the length of the slide. In this depicted embodiment, only one wedge element 76 is employed. This wedge is provided with an inner side edge that is contoured with two smooth camming surfaces 190 and 192 that are also disposed in tandem, but reversely of the camming surfaces 186 and 188 of the slide such that these camming surfaces of the slide and the wedge slidably mate. The opposite side edge 194 of the wedge is provided with a V-groove 196, one leg of which is receivable within the groove 28 and the opposite leg of which is receivable in a groove in the inner surface of a segment. Movement of the wedge longitudinally of the groove 28 toward the distal end 70 of the core section groove is limited by a stop 101 which is fixedly mounted to the core section. Movement of the slide is effected by an actuator 45 which includes a block 198 slidably mounted in the groove 28 and an externally threaded bolt 200, the head 202 of which is accessible from the end 70' of the groove 28. As indicated by the arrows "C" and "D" of FIG. 21, activation of the bolt 200 serves to urge the slide 16 away from the block 198 and toward the distal end 70 of the groove 28. By reason of the spatial relationship of the slide and the wedge, and the presence of the stop 101, once the slide has pushed the wedge into contact with the stop, the continued application of force to the slide (arrow "D") by the actuator results is lateral movement of the slide and/or the wedge (arrow "C"), causing one or both of these members to frictionally engage the side edges of a groove 36 in an overlying half-segment. Reversal of the direction of activation of the bolt frees the slide and wedge such that they retract from their engagement with the groove in the half-segment and thereby release the half-segment for longitudinal movement relative to the groove 28 in the core section.

A further embodiment of the apparatus of the present invention is depicted in FIG. 23 wherein there is depicted an actuator 45 which comprises a cam 210 rotatably mounted on one end of a stub shaft 212. This stub shaft is rotatably mounted in a through opening (not shown) in tae core section 16 and projects from the inner surface 216 of the core section to receive thereon a handle 218. Preferably, the actuator is located adjacent one open end of the drum and therefore is readily accessible to an operator. Rotation of the stub shaft via the handle 212 effects rotation of the cam 210 which engages the inboard end 220 of a slide 61 to impart longitudinal movement of the slide along the groove 28 in the outer surface of the core section.

Figure 24:
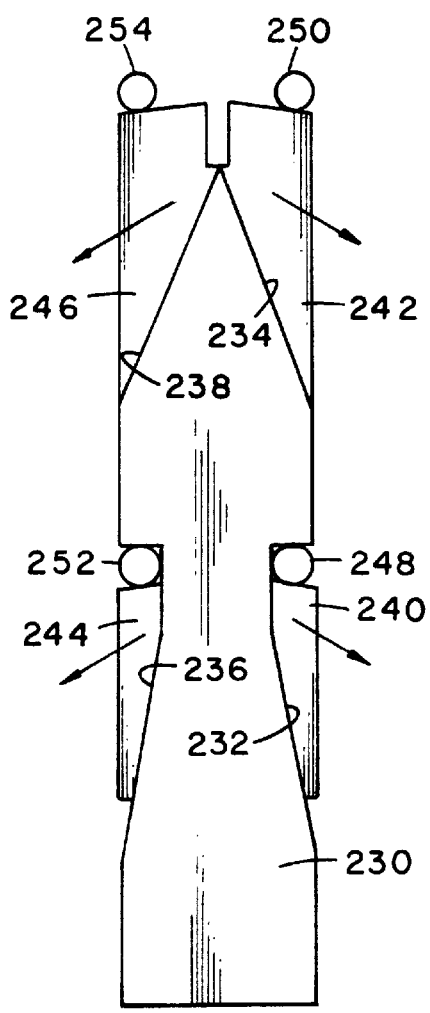
FIG. 24 is a plan view depicting a further embodiment of the apparatus of the present invention and which employs multiple sets of wedges.

A still further embodiment of the apparatus of the present invention is depicted in FIG. 24 and comprises a unitary slide 230 having tandemly disposed camming surfaces 232, 234, and 236, 238 along each of its opposite side edges. Each camming surface is provided with a mating wedge 240, 242, 244, and 246, respectively. The distal end of each wedge is limited in the extent of its movement along the groove in the core section and toward its extended position by respective stops 248, 250, 252, and 254. In this embodiment, movement of the slide in a direction longitudinally along the groove of a core section and away from an actuator for the slide results in lateral movement of the several wedges toward frictional engagement with the side edges of the overlying dovetail grooves in the core section and the half-segment.

Figure 25:
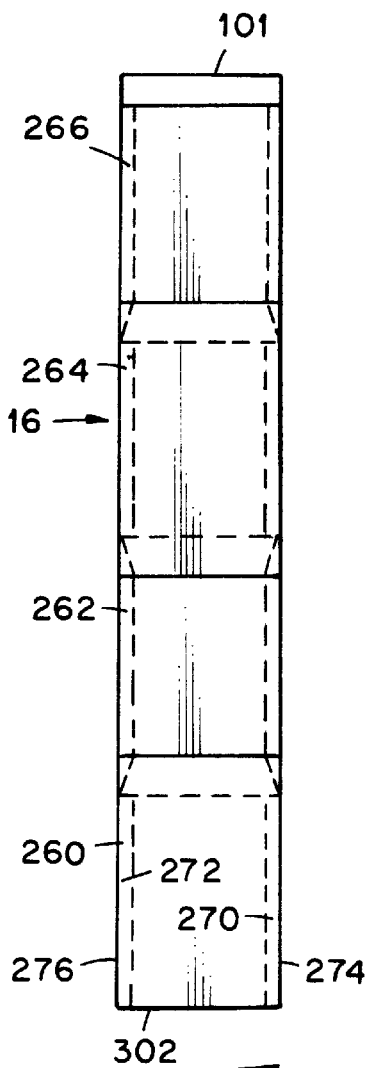
FIG. 25 is a plan view of an alternative multisectional embodiment of a slide element of the present invention and which employs radial displacement of the slide sections to effect locking of a half-segment to a core section.
Figure 26:
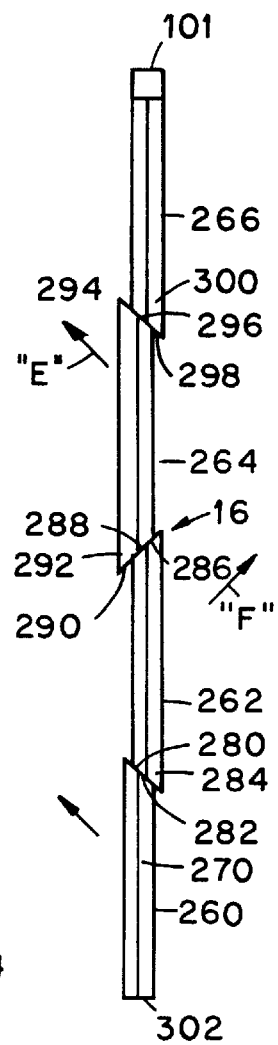
FIG. 26 is a side view of the slide element depicted in FIG. 25 and showing the radial displacement of the slide sections when in their segment/core locking positions.

Another embodiment of a slide 16 useful in the apparatus of the present invention is depicted in FIGS. 25 and 26. In this embodiment, the slide comprises a plurality of separate individual sections 260, 262, 264, and 266 disposed in tandem and slidably receivable with the groove of a core section. Each section, section 260 for example, is provided with a V-groove 270, 272 in each of its opposite side edges 274 and 276, respectively. This slide is mounted in the groove 28 of the core section with one side edge of the core section groove received in one leg of the V-groove, and with one side edge of the half-segment groove received in the other leg of the same V-groove. This arrangement is repeated along the opposite side edges of the other sections of the slide such that the half-segment is interlocked with the core section. As best seen in FIG. 26, the first section 260 of the slide is provided with an inclined camming surface 280 which mates with an oppositely inclined camming surface 282 on one end 284 of the second section 262. The opposite end 286 of the second section is provided with an inclined camming surface 288 which mates with an oppositely inclined camming surface 290 on one end 292 of the third section 264. Further, the opposite end 294 of the third section 264 is provided with an inclined camming surface 296 which mates with an oppositely inclined camming surface 298 on one end 300 of the fourth section 266. Fourth section 266 is juxtaposed to a stop 101. As discussed hereinabove the interlocking relationship between the slide sections and the core section and half-segment grooves is initially sufficiently loose as to permit longitudinal positioning of the half-segment with respect to the core section. Upon achievement of the desired longitudinal position of the half-segment, activation of an actuator, acting against the inboard end 302 of the slide 16 causes the sections of the slide to move generally radially with respect to one another (see arrows "E" and "F") thereby resulting in alternate ones 260 and 264 of the sections to move away from the core section and toward the half-segment and other alternate ones 262 and 266 of the sections to move toward the core section and away from the half-segment. This action causes the side edges of the sections to frictionally engage the side edges of the grooves in the core section and in the half-segment to anchor the half-segment to the core section.

The present apparatus further is adaptable to development of different diameters for the drum. As depicted in FIGS. 21 and 22, two half-segments 34 and 34' may be mounted on a diameter spacer 310 employing the apparatus of the present invention or other suitable mounting means. This subassembly of diameter spacer and half-segments is thereafter mountable on a core section 16. To this end, the inner surface 312 of the diameter spacer is contoured to matingly fit over the outer surface of the core section. This inner surface of the diameter spacer is provided with a longitudinally extending outwardly opening dovetail groove 314 which is of a geometry and dimensioned substantially like the groove 28 in the outer surface of the core section. As discussed hereinbefore this groove 314 in the diameter spacer is overlaid over the groove 28 in the core section to define a channel therebetween. Within this channel there is provided apparatus as depicted and described herein for releasably anchoring the diameter spacer, hence the half-segments 34 and 34' to the core section 16. The apparatus of FIG. 21 is particularly useful in anchoring a diameter spacer to a core section. This means for anchoring a diameter spacer to a core section is similarly useful when anchoring a single segment to a care section.

Figure 27:
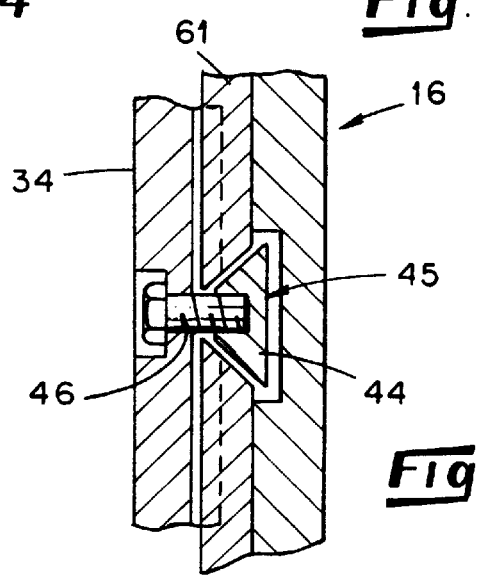
FIG. 27 is a representation, partly exploded, depicting an alternative embodiment of an actuator which is movable radially outwardly of the drum for activation thereof.

Referring to FIG. 27, there is depicted an embodiment of the apparatus of the present invention wherein the actuator 45 thereof is oriented such that block 44 thereof is radially moveable in similar manner as the block 44 depicted in FIG. 8, but the directionality of radial movement that produces locking is opposite to the directionality of radial movement of the block depicted in FIG. 8. Further the directionality of the inclination of the camming surfaces of the block and the inboard end of the slide are reversed from that depicted in FIG. 8. Additionally, the slide 16 is slidably disposed within the groove 36 of the half-segment as opposed to being disposed within the groove 28 in the core section. Thus, in the embodiment of FIG. 27, the block 44 is activated by means of a threaded screw 46 that extends through the thickness of the half-segment 34 to threadably engage the block 44. Rotation of the screw 46 serves to draw the block toward the half-segment and urge the slide longitudinally of the groove 36 for anchoring of the half-segment to the core section.

In one embodiment, the method of the present invention for releasably attaching a shell segment to a core section of a drum which exhibits a radially collapsible outer circumferential surface that is defined by a plurality of core sections, each of which includes an arcuate outer surface, each of the shell segments including an arcuate inner surface having substantially the same radius of curvature as the arcuate outer surface of the core section, the shell segments being disposed in overlying relationship to a respective core section with their respective inner surface in facing relationship with the outer surface of the core section, the shell segments being releasably attached to their respective core section comprises the steps of providing an outwardly opening groove in the outer surface of the core section and extending along the length dimension of the core section, providing an outwardly opening groove in the inner surface of the shell segment and extending along the length dimension of the shell segment, aligning the core section and the shell segment in facing relationship with one another with the groove in the outer surface of the shell segment disposed in overlying relationship to the groove in the core section to define a channel therebetween, the channel including at least one outboard end, providing the core section and the shell segment in facing relationship with one another with the groove in the outer surface of the shell segment disposed in overlying relationship to the groove in the core section to define a channel therebetween, the channel including at least one outboard end, providing at least partially within the channel an actuator having at least one camming surface, disposing within the channel, slide means including an inboard end defining a camming surface which is disposed in operative relationship to a camming surface of the actuator such that activation of the actuator causes the camming surface of the actuator to engage the camming surface of the inboard end of the slide to urge the slide in a direction away from the actuator, the slide means further including an outboard end defining at least one inwardly tapered side edge, providing within the channel, wedge means having opposite side edges, one of the side edges defining a tapered surface that is disposed in engaging and sliding relationship to the tapered side edge of the slide means such that longitudinal movement of the slide means in a direction away from the actuator urges the wedge means in a direction away from the actuator, limiting the longitudinal movement of the wedge means in a direction away from the actuator, thereafter, continuing to urge the slide in a direction away from the actuator such that after the movement of said wedge means has been limited, the forces exerted upon the wedge means are redirected to urge the wedge means into frictional engagement with at least one side edge of the channel to releasably anchor the segment and the core section to one another. Upon deactivation of the actuator, the slide is free to move toward the actuator hereby releasing the engagement of the wedge with the side edge of the channel and release the segment for movement relative to its respective core section.

Whereas the present invention has been described in connection with a specific embodiment, it is to be recognized that various modifications of the system may be made without departing from the scope of the invention as defined in the claims appended hereto.

What is claimed:

1. In a drum for the manufacture of a toroidal structure, which drum exhibits a radially collapsible outer circumferential surface that is defined by a plurality of core sections, each of which includes an arcuate outer surface, and including a plurality of shell segments, each of which includes an arcuate inner surface having substantially the same radius of curvature as the outer surface of the core section, each shell segment being disposed in overlying relationship to a respective core section with their respective outer and inner surfaces in facing relationship, the shell segments being releasably attached to individual ones of the core sections, the improvement for effecting releasable attachment of a shell segment to a core section comprising means defining an outwardly opening groove in the outer surface of said core section and extending along the length dimension of said core section, means defining an outwardly opening groove in the inner surface of said shell segment and extending along the length dimension of said shell segment, said core section groove and said shell segment groove being aligned with and in facing relationship with one another when said shell segment is disposed in overlying relationship to its respective core section to define a channel therebetween, said channel including at least one outboard end, slide means disposed within said channel, said slide means including an inboard end defining a surface, and further including an outboard end defining at least one inwardly tapered side edge, actuator means including at least one camming member surface disposed at least partially within said channel in operative proximity to said inboard end of said slide means such that activation of said actuator causes said camming member of said actuator to engage said surface of said inboard end of said slide to urge said slide longitudinally away from said actuator, wedge means disposed within said channel and including opposite side edges, one of said side edges defining a tapered surface that is disposed in engaging and camming relationship to said at least one tapered side edge of said slide means such that movement of said slide means along said channel in a direction away from said actuator means urges said wedge means along said channel in a direction away from said actuator, means disposed within said channel for limiting the movement of said wedge means in a direction away from said actuator, whereby movement of said wedge means pursuant to the urging thereof by said slide means is converted into lateral movement of said wedge means that forces said wedge means into frictional engagement with at least one of the side edges of said channel to anchor said shell segment to said core section.

2. The improvement of claim 1 and including means defining a further inwardly tapered side edge on said outboard end of said slide means opposite said at least one inwardly tapered side edge of said slide means, and further wedge means is provided in operative relationship said further tapered side edge of said slide means.

3. The improvement of claim 1 and including spring means disposed between said outboard end of said slide means and said means for limiting movement of said wedge means in a direction away from said actuator means for biasing said slide means in a direction toward said actuator means.

4. The improvement of claim 1 wherein said means for limiting the movement of said wedge means in a direction away from said actuator includes stop means disposed within said channel and means for adjustably selecting the position of said stop means within said channel.

5. The improvement of claim 1 wherein each of said groove in said core section and said groove in said shell segment includes opposite side edges which are directed inwardly of respective ones of said grooves and when disposed in overlying relationship, project inwardly of said channel to define inwardly directed side edges of said channel.

6. The improvement of claim 5 wherein said wedge means includes a V-shaped groove in a side edge thereof which is disposed in juxtaposition to one of said side edges of said channel and receives in said V-shaped groove an inwardly directed side edge of said channel for interlocking said grooves to one another.

7. The improvement of claim 1 wherein said actuator means is positionable radially of said drum to effect activation thereof.

8. The improvement of claim 1 wherein said actuator means is positionable longitudinally of said channel to effect activation thereof.

9. The improvement of claim 1 wherein each of said groove in said core section and said groove in said segment is a dovetail groove.

10. The improvement of claim 9 wherein said slide means includes chamfered opposite side edges which are received within said dovetail groove of said core section.

11. The improvement of claim 1 wherein said actuator means is accessible externally of the drum.

12. In a drum for the manufacture of a toroidal structure, which drum exhibits a radially collapsible outer circumferential surface that is defined by a plurality of core sections, each of which includes an arcuate outer surface, and including two shell segments per each core section, each of the shell segments including an arcuate inner surface having substantially the same radius of curvature as the arcuate outer surface of the core section, the two shell segments being disposed in overlying relationship to a respective core section with their respective inner surfaces in facing relationship with the outer surface of the core section, the shell segments being releasably attached to their respective core section, the improvement for effecting releasable attachment of the shell segments to their respective core section comprising means defining an outwardly opening groove in the outer surface of said core section and extending along the length dimension of said core section, means defining an outwardly opening groove in the inner surface of each of the two shell segments and extending along the respective length dimension of each of the shell segments, said core section groove and said shell segments grooves being aligned with and in facing relationship with one another when said shell segments are disposes in overlying relationship to their respective core section to define a channel therebetween, said channel including opposite side edges and opposite outboard ends, actuator means disposed within said channel, said actuator means including opposite side edges each of which defines a camming surface thereon, each of said camming surfaces being disposed within said channel, first and second slide means disposed within said channel and on opposite sides of said actuator, each of said slide means including an inboard end defining a camming surface which is disposed in operative relationship to one of said camming surfaces of said actuator such that activation of said actuator causes said camming surfaces of said actuator to engage said camming surfaces of said inboard ends of said slides to simultaneously urge said slides in a direction away from said actuator, each of said slide means further including an outboard end defining at least one inwardly tapered side edge, first wedge means disposed within said channel and operatively disposed with respect to a respective one of said tapered side edges of said first slide means, and second wedge means disposed within said channel and operatively disposed with respect to a respective one of said tapered side edges of said second slide means, each of said first and second wedge means including opposite side edges, one of said side edges defining a tapered surface that is disposed in engaging and sliding relationship with its respective tapered side edge of its respective slide means such that longitudinal movement of each of said first and second slide means longitudinally of said channel simultaneously urges said first and second wedge means longitudinally of said channel in a direction away from said actuator means, stop means for limiting the movement of said first and second wedge means in a direction away from said actuator means whereby longitudinal movement of said first and second wedge means pursuant to the urging thereof by said first and second slide means is converted into lateral movement of said wedge means and resulting frictional engagement with at least one of the side edges of said channel to thereby anchor said shell segments to said core section.

13. The improvement of claim 12 wherein said actuator is positionable radially of said drum to effect activation thereof.

14. The improvement of claim 12 wherein said actuator is positionable longitudinally of said channel to effect activation thereof.

* * * * *